(12) United States Patent
Chou

(10) Patent No.: US 10,159,125 B1
(45) Date of Patent: Dec. 18, 2018

(54) LED POWER SUPPLY DEVICE

(71) Applicant: DELTA ELECTRONICS, INC., Taoyuan (TW)

(72) Inventor: Ching-Ho Chou, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 15/856,072

(22) Filed: Dec. 28, 2017

(30) Foreign Application Priority Data

Jun. 14, 2017 (CN) .......................... 2017 1 0448615

(51) Int. Cl.
*H05B 37/00* (2006.01)
*H05B 33/08* (2006.01)
*H02M 3/335* (2006.01)
*H02M 1/42* (2007.01)

(52) U.S. Cl.
CPC .... *H05B 33/0815* (2013.01); *H02M 3/33569* (2013.01); *H02M 1/4208* (2013.01)

(58) Field of Classification Search
CPC .......... H01J 61/56; H01J 61/90; H05B 41/32; F21K 9/00; F21V 23/02; H01K 1/62; H01K 7/02; H01K 1/26; H01R 33/9453
See application file for complete search history.

(56) References Cited

U.S. PATENT DOCUMENTS

| | | | |
|---|---|---|---|
| 9,263,960 B2 | 2/2016 | Jovanović et al. | |
| 2010/0246216 A1* | 9/2010 | Coulson | H02M 3/33523 363/21.12 |
| 2011/0006700 A1 | 1/2011 | Chen et al. | |
| 2015/0062971 A1 | 3/2015 | Ye et al. | |

(Continued)

FOREIGN PATENT DOCUMENTS

| CN | 104426408 A | 3/2015 |
|---|---|---|
| TW | 201417486 A | 5/2014 |

OTHER PUBLICATIONS

LLC Resonant Converter With Semiactive Variable-Structure Rectifier (SA-VSR) for Wide Output Voltage Range Application, H. Wu, Y. Li and Y. Xing, IEEE Transactions on Power Electronics, vol. 31, No. 5, pp. 3389-3394, May 2016.

(Continued)

*Primary Examiner* — Minh D A
(74) *Attorney, Agent, or Firm* — CKC & Partners Co., Ltd.

(57) ABSTRACT

An LED power supply device includes a primary winding, a secondary winding, a charge-pump capacitor, a bridge rectifier circuit, a unidirectional controlled switch, and an output capacitor. The secondary winding includes a first terminal and a second terminal and configured to provide a secondary current in response to a primary current flowing through the primary winding. A first terminal of the charge-pump capacitor is coupled to the second terminal of the secondary winding. The bridge rectifier circuit is coupled to the first terminal of the secondary winding and a second terminal of the charge-pump capacitor. The unidirectional controlled switch is reversely coupled to one of multiple diodes in the bridge rectifier circuit, and configured to be on or off according to a control voltage selectively. The output capacitor is coupled to the bridge rectifier circuit and configured to provide an output voltage according to the secondary current.

20 Claims, 8 Drawing Sheets

(56) References Cited

U.S. PATENT DOCUMENTS

2015/0207414 A1\* 7/2015 Halberstadt ....... H02M 3/33507
　　　　　　　　　　　　　　　　　　　　　　　363/21.14
2017/0063251 A1 　3/2017 Ye et al.

OTHER PUBLICATIONS

On-the-fly topology-morphing control-efficiency optimization method for llc resonant converters operating in wide input- and/or output-voltage range, M. M. Jovanovic and B. T. Irving, IEEE Transactions on Power Electronics, vol. 31, No. 3, pp. 2596-2608, Mar. 2016.

\* cited by examiner

LED POWER SUPPLY DEVICE

RELATED APPLICATIONS

This application claims priority to China Application Serial Number 201710448615.4 filed Jun. 14, 2017, which is herein incorporated by reference.

BACKGROUND

Technical Field

The present disclosure relates to a power supply, and in particular, to a light-emitting diode (LED) power supply with wide range output.

Description of Related Art

Recently, resonant circuit structure is widely applied in power electronics devices in the field such as charging battery, solar PV (photovoltaic) system, and solid state lighting as the trend of smaller sizes and higher efficiency in design.

However, in order to satisfy various loads, power supplies applying the resonant circuit has to provide wide-range input and output voltage, in order to adapt the power requirements for various product specifications. Therefore, an important area of research in the field involves ways in which to design the power conversion circuit to achieve wide-range input and/or output voltage.

SUMMARY

One aspect of the present disclosure is a light-emitting diode power supply device. The light-emitting diode power supply device includes a primary winding, a secondary winding, a charge-pump capacitor, a bridge rectifier circuit, a unidirectional controllable power switch and an output capacitor. The secondary winding includes a first terminal and a second terminal, and is configured to output a secondary current in response to a primary current flowing through the primary winding. The charge-pump capacitor includes a first terminal and a second terminal. The first terminal of the charge-pump capacitor is electrically coupled to the second terminal of the secondary winding. The bridge rectifier circuit is electrically coupled to the first terminal of the secondary winding and the second terminal of the charge-pump capacitor. The unidirectional controllable power switch is inversely parallel-connected to one of a plurality of diodes in the bridge rectifier circuit, and configured to be on or off selectively according to a control voltage. The output capacitor is electrically coupled to the bridge rectifier circuit and configured to provide an output voltage according to the secondary current.

Another aspect of the present disclosure is a power supply device for providing an output voltage to a light-emitting diode module. The power supply device includes an isolated transformer including a primary winding and a secondary winding, a primary circuit, a charge-pump capacitor, a bridge rectifier circuit, and a unidirectional controllable power switch. The secondary winding is configured to provide a secondary current in response to a primary current flowing through the primary winding. The primary circuit is electrically coupled to the primary winding of the isolated transformer and configured to provide the primary current according to a dc input voltage. The charge-pump capacitor is electrically coupled to the secondary winding. The bridge rectifier circuit includes a first diode, a second diode, a third diode, and a fourth diode. The unidirectional controllable power switch is inversely parallel-connected to the third diode or the fourth diode and configured to be on or off selectively to determine the power supply device operating under a first modulation mode or a second modulation mode to output the corresponding output voltage. Under the first modulation mode, the unidirectional controllable power switch is kept at off, and under the second modulation mode, the unidirectional controllable power switch is kept at on.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
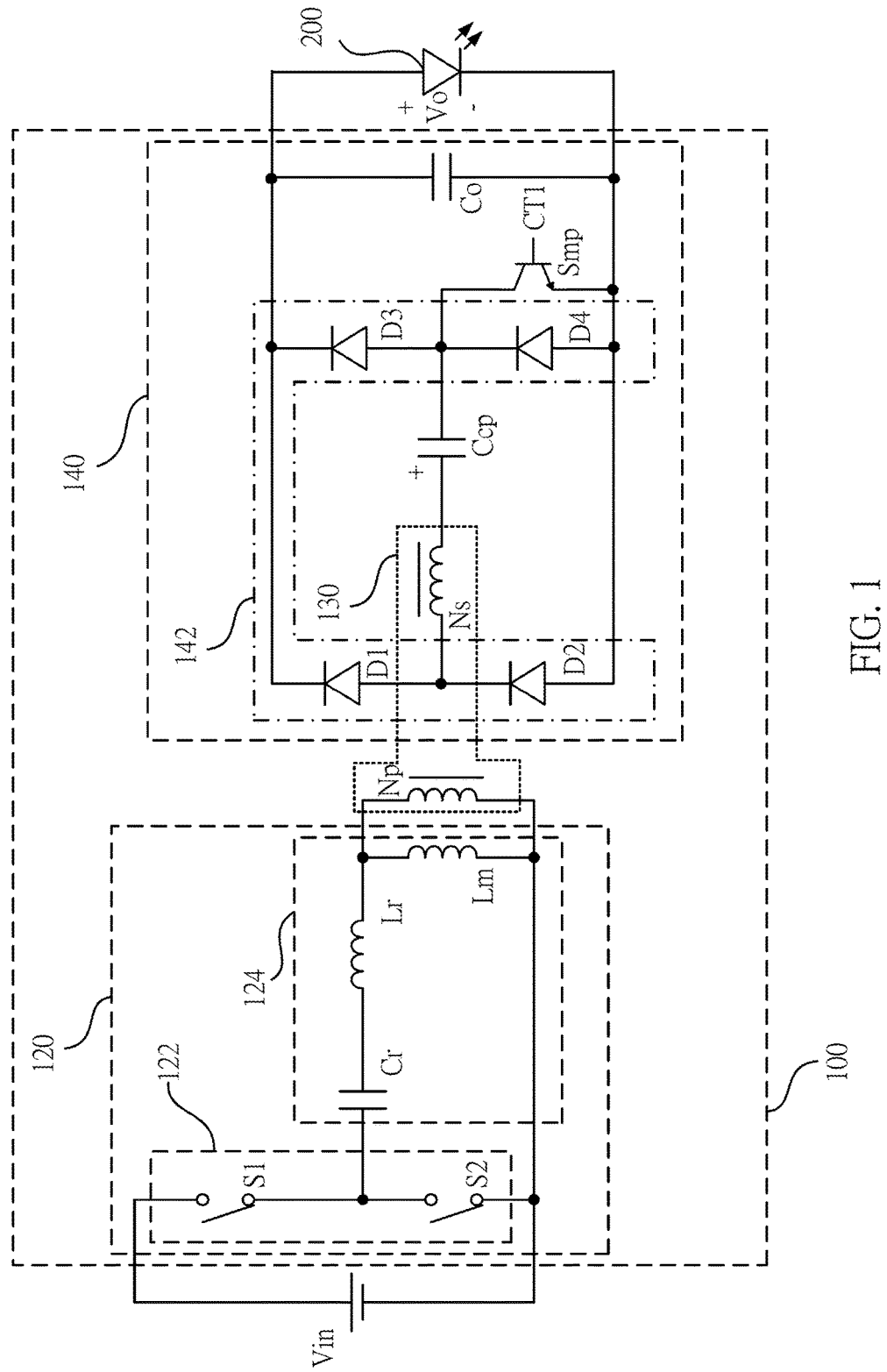
FIG. 1 is a diagram illustrating a light-emitting diode (LED) power supply according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Reference is made to FIG. 1. FIG. 1 is a diagram illustrating a light-emitting diode (LED) power supply 100 according to some embodiments of the present disclosure. As shown in FIG. 1, in some embodiments, the LED power supply is configured to provide an output voltage Vo to the LED module 200, to drive the LED module 200 and provide the electricity required for its operation.

In some embodiments, the LED power supply device 100 may provide a wide range of the output voltage Vo to the LED module 200 to match the type and the number of the LED module 200 string connected at the load, in order to meet the specification requirement of the product.

As shown in FIG. 1, in some embodiments, the LED power supply device 100 applies a resonant circuit structure to perform the power conversion. Specifically, the LED power supply device 100 includes a primary circuit 120, a primary winding Np and a secondary winding Ns of an isolated transformer 130, and a secondary circuit 140. The primary circuit 120 is electrically coupled between a dc voltage source and the primary winding Np, and configured to receive a DC input voltage Vin and provide the primary current flowing through the primary winding Np according to the DC input voltage Vin.

As shown in FIG. 1, in some embodiments, the primary circuit 120 includes the switching circuit 122 and the resonant circuit 124. The switching circuit 122 is configured to convert the DC input voltage Vin to a switching signal. An input terminal of the switching circuit 122 is electrically coupled to the dc voltage source and configured to receive the DC input voltage Vin. An output terminal of the switching circuit 122 is electrically coupled to an input terminal of the resonant circuit 124, and configured to output the switching signal after conversion to the resonant circuit 124.

In some embodiments, the switching circuit 122 may apply a half-bridge structure to achieve the half-bridge resonant converter, but the present disclosure is not limited thereto. As shown in FIG. 1, the switching circuit 122 includes the switch S1 and the switch S2. A first terminal of the switch S1 is electrically coupled to the positive terminal of the DC input voltage Vin, and a second terminal of the switch S1 is electrically coupled to the resonant circuit 124. A first terminal of the switch S2 is electrically coupled to a second terminal of the switch S1, and a second terminal of the switch S2 is electrically coupled to the negative terminal of the DC input voltage Vin. Control terminals of the switch S1 and the switch S2 are respectively configured to receive driving signals such that the switch S1 and the switch S2 are on or off selectively according to the driving signals.

Thus, the switching circuit 122, by selectively turning on one of the switch S1 and the switch S2, may output a high level (e.g., DC input voltage Vin) switching signal when the switch S1 is on, and output a low level (e.g., zero level) switching signal when the switch S2 is on. For example, in a complete switching cycle, the driving signal may be a Pulse Frequency Modulation (PFM) signal, and the switch S1 and the switch S2 may be turned on for half of the cycle respectively in order to output a switching signal with 50% duty cycle.

It is noted that, in some applications of the LED driving circuit with lower power range (e.g., lower than about 500 W), the switching circuit 122 may apply a half bridge structure. In some other embodiments with high power (e.g., greater than about 500 W) application, the switching circuit 122 may also apply a full bridge structure to achieve the full bridge resonant converter. For example, the switching circuit 122 may also include four switches, driven in two pairs in which the switches receive corresponding driving signals to be on or off selectively. Thus, in a complete cycle, the switching circuit 122 may turn on one pair of the switches in the first half cycle according to the driving signal and turn off the other pair of the switches to output the switching signal having a positive level, and switch the on and off of the switches in the second half cycle according to the driving signal to output the switching signal having a negative level.

The resonant circuit 124 is electrically coupled to the switching circuit 122 and the primary winding Np. Specifically, an output terminal of the resonant circuit 124 is electrically coupled to the primary side of the transformer 130. The resonant circuit 124 is configured to receive the switching signal from the switching circuit 122 to provide the primary current flowing through the primary winding Np.

In some embodiments, the resonant circuit 124 includes the resonant capacitor unit Cr, the resonant inductor unit Lr, and the magnetic inductor unit Lm, but the present disclosure is not limited thereto. The resonant capacitor unit Cr, the resonant inductor unit Lr and the primary winding Np of the transformer 130 are coupled to each other in series. The magnetic inductor unit Lm and the primary winding Np of the transformer 130 are coupled to each other in parallel. For example, as shown in FIG. 1, the first terminal of the resonant capacitor unit Cr is electrically coupled to the first terminal of the resonant circuit 124 in order to be electrically coupled to the second terminal of the switch S1 and the first terminal of the switch S2. The second terminal of the resonant capacitor unit Cr is electrically coupled to the first terminal of the resonant inductor unit Lr. The second terminal of the resonant inductor unit Lr is electrically coupled to the first terminal of the magnetic inductor unit Lm. The second terminal of the magnetic inductor unit Lm is electrically coupled to the second terminal of the resonant circuit 124, in order to be electrically coupled to the negative terminal of the DC input voltage Vin, but the present disclosure is not limited thereto. In some embodiments, the resonant inductor unit Lr and the magnetic inductor unit Lm may be magnetic integrated respectively to the leakage inductance and the magnetizing inductance of the transformer 130.

In some other embodiments, the resonant capacitor unit Cr, the resonant inductor unit Lr, and the magnetic inductor unit Lm may also be electrically coupled in various ways to achieve a LLC resonant circuit. In addition, in some other embodiments, the resonant circuit 124 may also achieve an LC resonant circuit, an LCC resonant circuit, an LLCC resonant circuit by one or more sets of the inductor unit and the capacitor unit. Therefore, the LLC resonant circuit illustrated in the drawing of the present disclosure is merely one example of the present disclosure and not meant to limit the present disclosure. Alternatively stated, one skilled in the art can understand that the resonant circuit 124 in various embodiments of the present disclosure may be any combinations of one or more inductor units and one or more capacitor units electrically coupled in series or parallel to achieve resonance.

Thus, the primary winding Np may receive the primary current from the resonant circuit 124. The secondary winding Ns may output the secondary current in response to the primary current flowing through the primary winding Np, such that the power transmission between the primary side and the secondary side is achieved by the transformer 130.

As shown in FIG. 1, in some embodiments, secondary circuit 140 includes a bridge rectifier circuit 142, a charge-pump capacitor Ccp, a unidirectional controllable power switch Smp, and an output capacitor Co. The bridge rectifier circuit 142 is electrically coupled to the first terminal of the secondary winding Ns and the second terminal of the charge-pump capacitor Ccp. The first terminal of the charge-pump capacitor Ccp is electrically coupled to the second terminal of the secondary winding Ns. The unidirectional controllable power switch Smp is inversely parallel-connected to one of diodes D1-D4 in the bridge rectifier circuit 142, and configured to be on or off selectively according to a control voltage CT1. The output capacitor Co is electrically coupled to the bridge rectifier circuit 142 and configured to provide the output voltage Vo according to the secondary current.

In some embodiments, the bridge rectifier circuit 142 is configured to rectify the secondary current. As shown in the drawing, the anode of the diode D1 in the bridge rectifier circuit 142 is electrically coupled to the first terminal of the secondary winding Ns, the cathode of the diode D1 is electrically coupled to the positive terminal of the output capacitor Co. The anode of the diode D2 is electrically coupled to a ground terminal of the secondary side, and the cathode of the diode D2 is electrically coupled to the first terminal of the secondary winding Ns and the anode of the diode D1. The anode of the diode D3 is electrically coupled to the second terminal of the charge-pump capacitor Ccp, and the cathode of the diode D3 is electrically coupled to the cathode of the diode D1 and the positive terminal of the output capacitor Co. The anode of the diode D4 is electrically coupled to the ground terminal of the secondary side, and the cathode of the diode D4 is electrically coupled to the second terminal of the charge-pump capacitor Ccp and the anode of the diode D3.

Thus, according to the direction of the secondary current, two pairs of the diodes D1, D4 and the diodes D2, D3 may be operated under corresponding working regions respectively to provide the current path to achieve the bridge rectification.

In the embodiments shown in FIG. 1, the unidirectional controllable power switch Smp may be an npn type bipolar transistor. A base terminal of the bipolar transistor is configured to receive the control voltage CT1 to selectively turn on or turn off the unidirectional controllable power switch Smp. The emitter terminal of the bipolar transistor is electrically coupled to the anode of the diode D4, and the collector terminal is electrically coupled to the cathode of the diode D4. Alternatively stated, in the present embodiment, the unidirectional controllable power switch Smp is inversely parallel-connected to the diode D4 in the bridge rectifier circuit 142, but the present disclosure is not limited thereto.

It is noted that, in various embodiments, the unidirectional controllable power switch Smp is not limited to the npn type bipolar transistor. For example, the unidirectional controllable power switch Smp may also include a pnp type bipolar junction transistor (BJT), an Insulated Gate Bipolar Transistor (IGBT), or a Silicon Controlled Rectifier (SCR).

For the convenience of explanation, specific operations of circuits and elements in the secondary circuit 140 will be discussed in the following paragraphs in accompanying with the relative drawings to explain how the LED power supply device 100 performs power conversion under the resonant circuit structure, and operates under different modulation modes selectively by whether the unidirectional controllable power switch Smp is on. Through configuring the LED power supply device 100 to operate under different modulation modes, the output voltage Vo may be switched between dc output with a normal voltage or a doubled voltage. Thus, the LED power supply device 100 may provide a wide range output voltage Vo to the LED module 200 to meet the requirement of the specification of the product.

Figure 2:
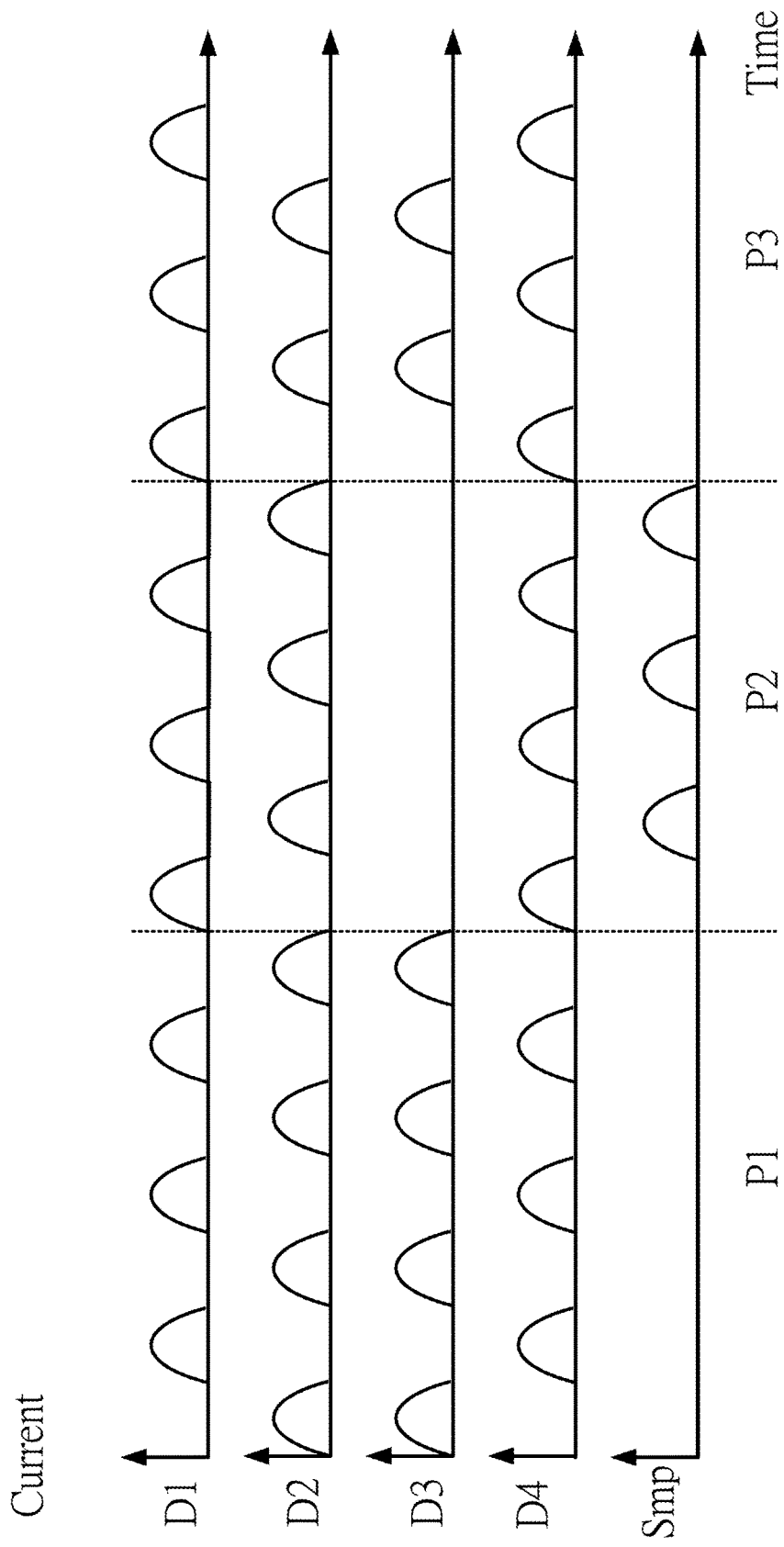
FIG. 2 is a diagram illustrating the current waveform according to some embodiments of the present disclosure.

Reference is made to FIG. 2. FIG. 2 is a diagram illustrating the current waveform according to some embodiments of the present disclosure. In the embodiments illustrated in FIG. 2, during the period P1 and P3, the unidirectional controllable power switch Smp is kept at off, and the LED power supply device 100 operates under a first modulation mode and outputs the output voltage Vo with a normal level. On the other hand, during the period P2, the unidirectional controllable power switch Smp is kept at on, and the LED power supply device 100 operates under a second modulation mode and outputs the output voltage Vo with a doubled level.

Figures 3A, 3B:
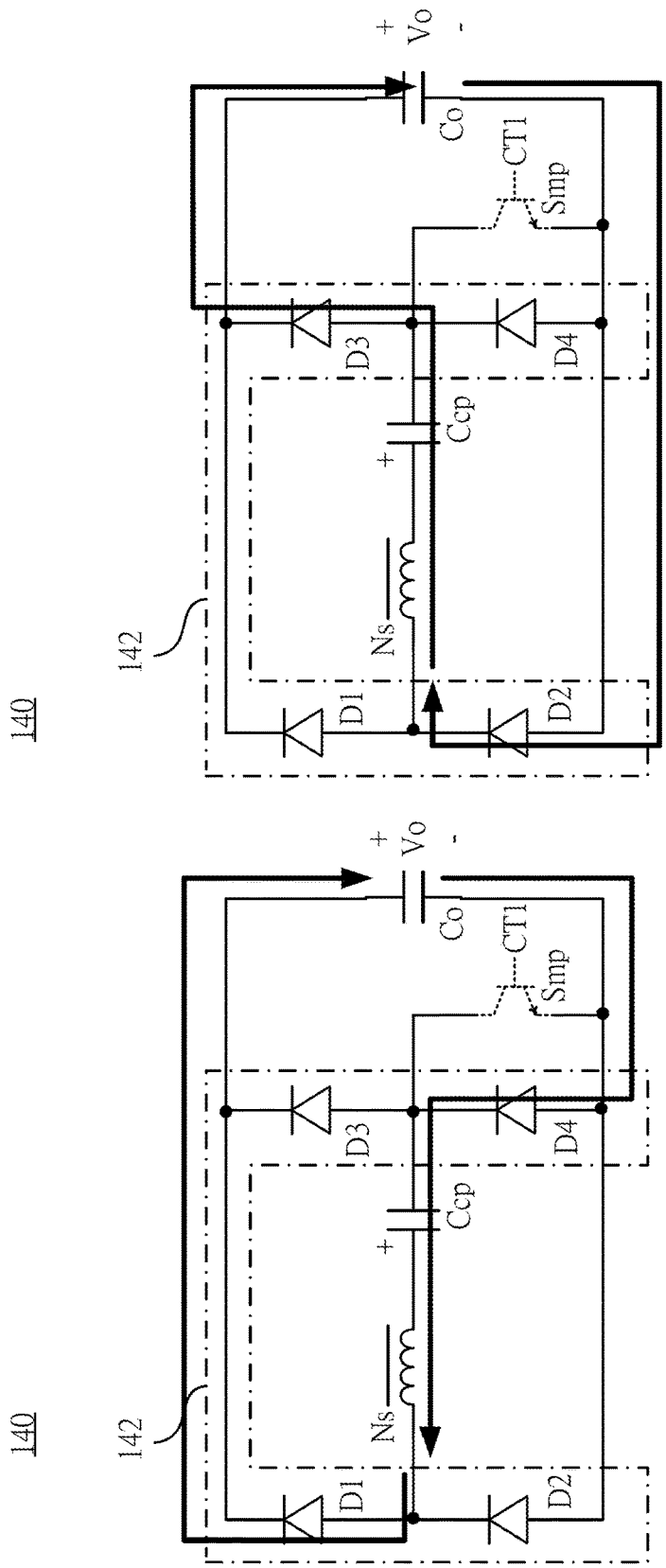
FIG. 3A and FIG. 3B are diagrams illustrating the operation of the secondary circuit on the condition that the LED power supply device operates under the first modulation mode according to some embodiments of the present disclosure.

Reference is made to FIG. 3A and FIG. 3B together. FIG. 3A and FIG. 3B are diagrams illustrating the operation of the secondary circuit 140 on the condition that the LED power supply device 100 operates under the first modulation mode according to some embodiments of the present disclosure. For clarity purpose, in the following paragraphs, current waveforms of the diodes D1-D4 in the periods P1 and P3 shown in the embodiments of FIG. 2 are discussed in accompanying, for better understanding of the operation of circuit elements in FIG. 3A and FIG. 3B. In the first modulation mode, the unidirectional controllable power switch Smp is kept at off, which is depicted with dotted line.

First, as shown in FIG. 3A, in the first half cycle, the secondary current flows through the forward conducting diodes D1, D4 and the charge-pump capacitor Ccp to charge the output capacitor Co. At the time, the diodes D2, D3 operates at the cut-off region.

Then, as shown in FIG. 3B, in the second half cycle, the secondary current flows through the forward conducting diodes D2, D3, and the charge-pump capacitor Ccp to charge the output capacitor Co. At the time, the diodes D1, D4 operates at the cut-off region. Since the direction of the current flowing through the charge-pump capacitor Ccp in the first and the second half cycles are opposite, the average current of the charge-pump capacitor Ccp is about zero. Thus, under the first modulation mode, the output voltage Vo on the output capacitor Co is about the average voltage (i.e., the normal level) of the secondary winding Ns after rectification.

As the current waveform in the period P1 depicted in FIG. 2, under the first modulation mode, two pairs of the diodes D2, D3 and the diodes D1, D4 are turned on by turns, such that the bridge rectifier circuit 142 achieves rectification and generates the output voltage Vo with the normal level between two terminals of the output capacitor Co. Alternatively stated, on the condition that the unidirectional controllable power switch Smp is off according to the control voltage CT1, the output voltage Vo is about the average voltage of the secondary winding after rectification in the complete cycle.

Specifically, the voltage of the secondary winding Ns may be adjusted by changing the switching frequency (i.e., the frequency of the switching signal) of the switching circuit 122 in the primary circuit 120. On the condition that the switching frequency is changed, the voltage division of the resonant capacitor unit Cr, the resonant inductor unit Lr, and the magnetic inductor unit Lm of the resonant circuit 124 changes correspondingly, such that the voltage induced by the secondary winding Ns also changes. Thus, the voltage level of the output voltage Vo may be adjusted under the first modulation mode.

Figures 4A, 4B:
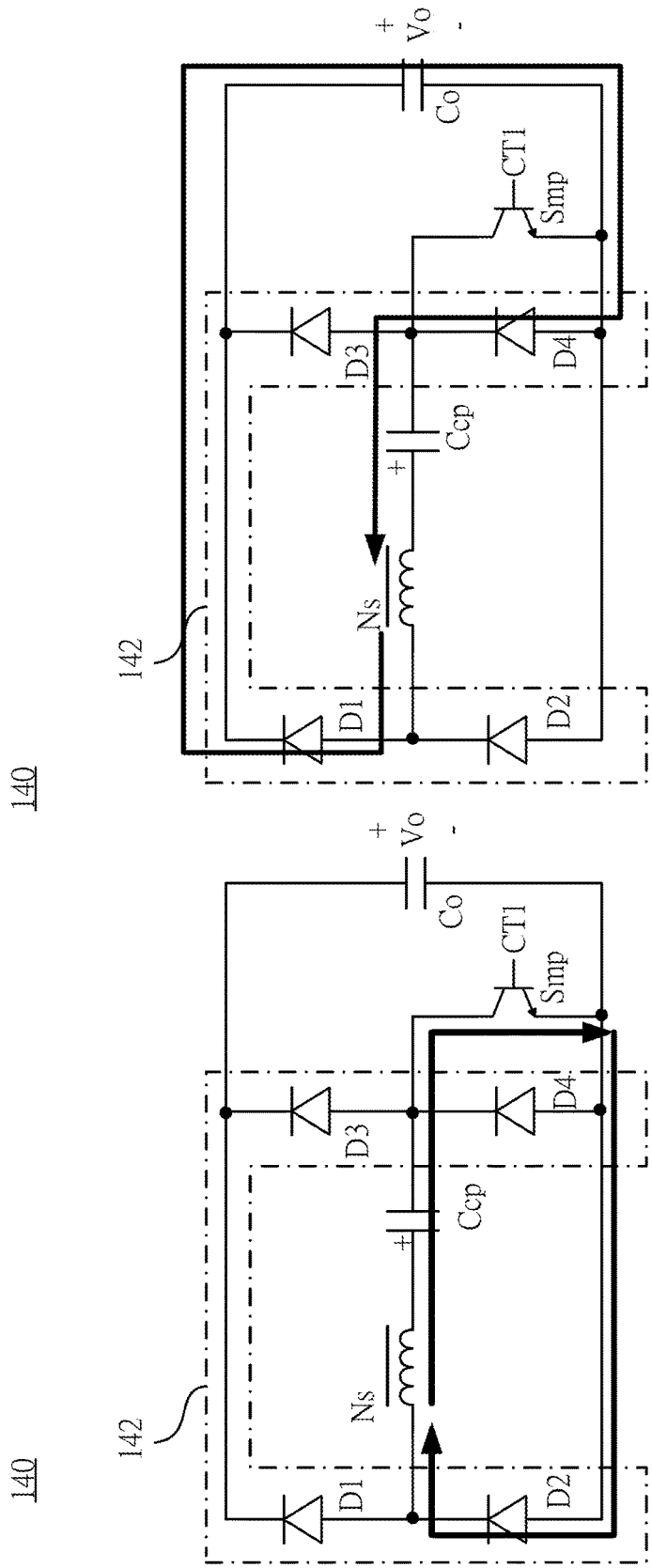
FIG. 4A and FIG. 4B are diagrams illustrating the operation of the secondary circuit on the condition that the LED power supply device operates under the second modulation mode according to some other embodiments of the present disclosure.

Reference is made to FIG. 4A and FIG. 4B together. FIG. 4A and FIG. 4B are diagrams illustrating the operation of the secondary circuit 140 on the condition that the LED power supply device 100 operates under the second modulation mode according to some other embodiments of the present disclosure. For clarity purpose, in the following paragraphs, current waveforms of the diodes D1-D4 in the period P2 shown in the embodiments of FIG. 2 are discussed in accompanying, for better understanding of the operation of circuit elements in FIG. 4A and FIG. 4B. In the second modulation mode, the unidirectional controllable power switch Smp is kept at on, which is depicted with solid line.

First, as shown in FIG. 4A, in the first half cycle, the secondary current on the secondary winding Ns flows to the charge-pump capacitor Ccp, and returns to the secondary winding Ns via the conducting unidirectional controllable power switch Smp and the diode D2. Accordingly, a charging voltage having the normal level is built between two terminals of the charge-pump capacitor Ccp. At the time, the diodes D1, D3, and D4 operate at the cut-off region.

Then, as shown in FIG. 4B, in the second half cycle, the secondary current with inverse direction flows through the forward conducting diode D1, the output capacitor Co, the diode D4 and the charge-pump capacitor Ccp and returns to the secondary winding Ns. At the time, the diodes D2, D3 operate at the cut-off region. Since the diodes D1, D4 conduct with the forward bias, the output voltage Vo is equivalent to the sum of the cross voltage of the secondary winding Ns and the cross voltage of the charge-pump capacitor Ccp. Thus, under the second modulation mode, the output voltage Vo with the doubled level is built between two terminals of the output capacitor Co.

Thus, on the condition that the unidirectional controllable power switch Smp is turned on according to the control voltage CT1, the secondary circuit 140 may store energy on the charge-pump capacitor Ccp, such that the output voltage Vo is about twice of the average voltage of the secondary winding Ns after rectification in the complete cycle.

Similarly, the voltage on the secondary winding Ns may be adjusted by changing the switching frequency (i.e., the frequency of the switching signal) of the switching circuit 122 in the primary circuit 120. On the condition that the switching frequency is changed, the voltage division of the resonant capacitor unit Cr, the resonant inductor unit Lr, and the magnetic inductor unit Lm in the resonant circuit 124 changes correspondingly, such that the voltage induced by the secondary winding Ns also changes. Thus, the voltage level of the output voltage Vo may be adjusted under the second modulation mode.

Alternatively stated, if other conditions are the same, the output voltage Vo outputted by the LED power supply device 100 operating under the second modulation mode is about twice of the output voltage Vo outputted by the LED power supply device 100 operating under the first modulation mode. Thus, if it is desired that the LED power supply device 100 outputs a high output voltage Vo, the switching frequency may be operated at an operating point closer to the resonant frequency of the resonant circuit 124 by operating the LED power supply device 100 under the second modulation mode. Thus, by switching the modulation mode, the wide range voltage output may be achieved with a small range frequency variation.

In summary, the unidirectional controllable power switch Smp may be configured to selectively on or off to determine the LED power supply device 100 operating under the first modulation mode or the second modulation mode to output the corresponding output voltage Vo. If the LED power supply device 100 operates under the first modulation mode, the unidirectional controllable power switch is kept at off, and the LED power supply device 100 provides the output voltage Vo with the normal level. On the other hand, if the LED power supply device 100 operating under the second modulation mode, the unidirectional controllable power switch is kept at off, and the LED power supply device 100 provides the output voltage Vo with the doubled level. Accordingly, the LED power supply device 100 may provide the wide range output voltage Vo to the LED module 200 to meet the requirements of different products.

Since the LED power supply device 100 does not have to switch the unidirectional controllable power switch Smp on the condition that the modulation mode remains unchanged, and no further control is required by the diodes D1-D4 in the bridge rectifier circuit 142, the LED power supply device 100 may reduce unnecessary power loss. In addition, in some embodiments, since the secondary circuit 140 does not use multiple active switching elements to achieve the charge-pump ability, no dead time configuration is required in the control circuit to avoid the current surge resulted when the switching elements are conducted at the same time. Thus, the control of the LED power supply device 100 may be further simplified.

Figures 5A, 5B:
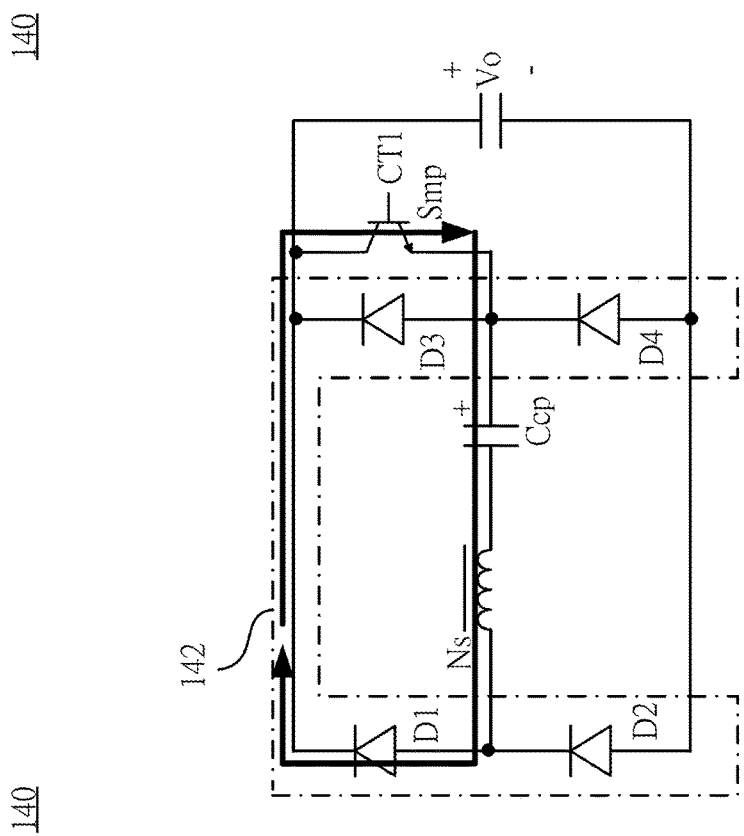
FIG. 5A and FIG. 5B are diagrams illustrating the operation of the secondary circuit on the condition that the LED power supply device operates under the second modulation mode according to some other embodiments of the present disclosure.

In addition, as stated in the above paragraphs, although the unidirectional controllable power switch Smp is inversely parallel-connected to the diode D4 in FIG. 1, FIG. 3A-FIG. 3B, and FIG. 3A-FIG. 3B, in some other embodiments, the unidirectional controllable power switch Smp may also be inversely parallel-connected to the diode D3. Reference is made to FIG. 5A and FIG. 5B. FIG. 5A and FIG. 5B are diagrams illustrating the operation of the secondary circuit 140 on the condition that the LED power supply device 100 operates under the second modulation mode according to some other embodiments of the present disclosure.

Compared to the embodiments shown in FIG. 1, FIG. 3A-FIG. 3B, and FIG. 3A-FIG. 3B, in the secondary circuit 140 depicted in FIG. 5A-FIG. 5B, the unidirectional controllable power switch Smp is inversely parallel-connected to the diode D3. Alternatively stated, the emitter terminal of the unidirectional controllable power switch Smp is electrically coupled to the anode of the diode D3, the collector terminal of the unidirectional controllable power switch Smp is electrically coupled to the cathode of the diode D3.

As shown in FIG. 5A, in the first half cycle, the secondary current on the secondary winding Ns flows through the forwarding conducting diode D1, the conducting unidirectional controllable power switch Smp, and returns to the secondary winding Ns via the charge-pump capacitor Ccp. Thus, similar to the embodiments shown in FIG. 4A, a charging voltage with the normal level is built between two terminals of the charge-pump capacitor Ccp. At the time, the diodes D2, D3, and D4 operate at the cut-off region.

Next, as shown in FIG. 5B, in the second half cycle, the secondary current in the inverse direction flows through the charge-pump capacitor Ccp, the forward conducting diode D3, the output capacitor Co and the diode D2 and returns to the secondary winding Ns. At the time the diodes D1, D4 operate at the cut-off region. Since the diodes D2, D3 forward conduct at the time, the output voltage Vo is equivalent to the sum of the cross voltage of the secondary winding Ns and the cross voltage of the charge-pump capacitor Ccp. Accordingly, the output voltage Vo with the doubled level may also be built between two terminals of the output capacitor Co.

In addition, since the unidirectional controllable power switch Smp is on according to the control voltage CT1, the current flowing through the diode D4 is zero. Alternatively stated, on the condition that the LED power supply device 100 operates under the second modulation mode, the diode D4 keeps operating in the cut-off region if the unidirectional controllable power switch Smp is inversely parallel-connected to the diode D3.

Figure 6:
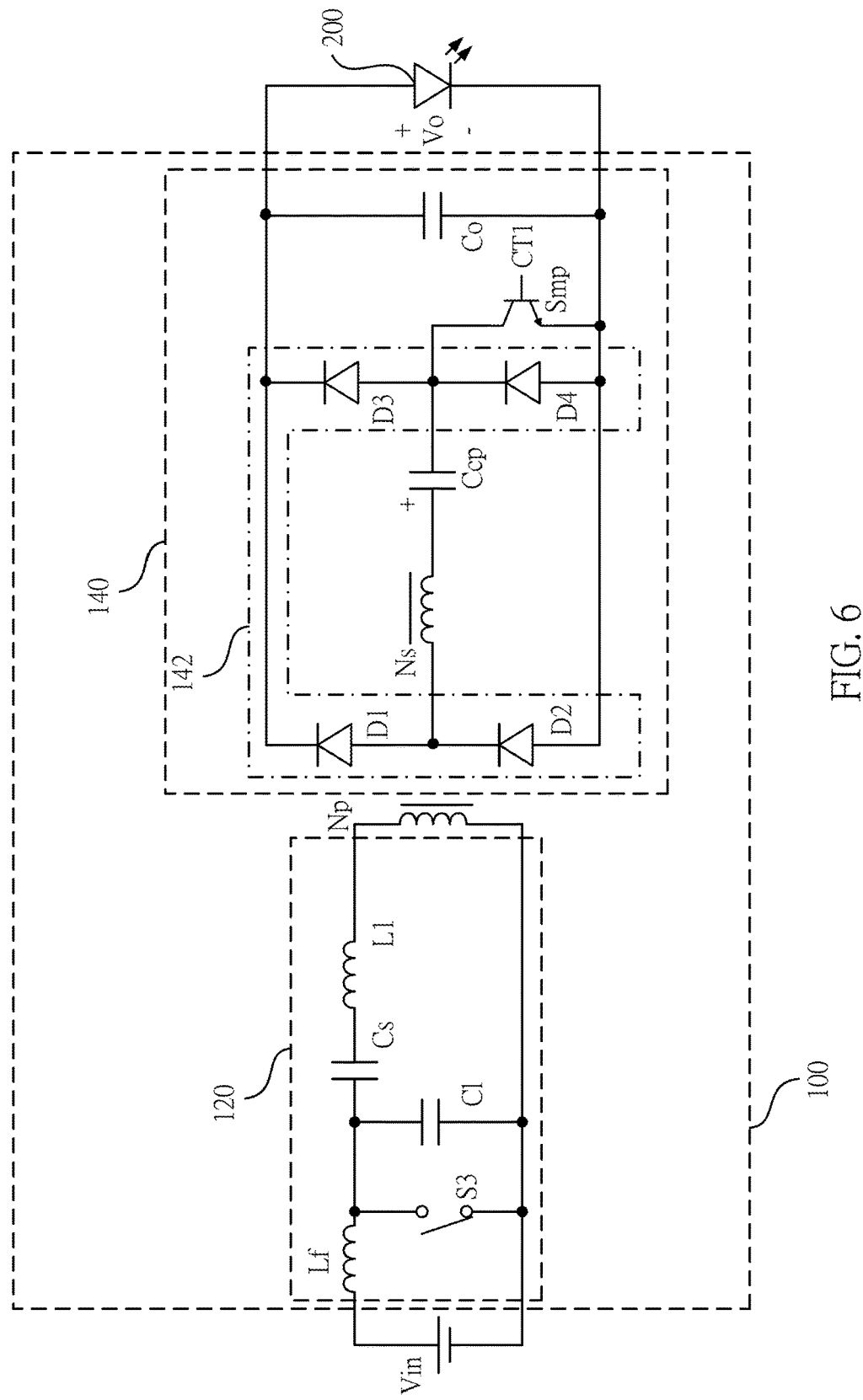
FIG. 6 is a diagram illustrating the LED power supply device according to some other embodiments of the present disclosure.

Reference is made to FIG. 6. FIG. 6 is a diagram illustrating the LED power supply device 100 according to some other embodiments of the present disclosure. In the present embodiment, compared to the embodiments shown in FIG. 1, the primary circuit 120 may be implemented by different structures.

For example, for low power (e.g., lower than 50 W) applications, the LED power supply device 100 may apply single switch resonant circuit to achieve the primary circuit 120. Specifically, as shown in FIG. 6, in some embodiments, the primary circuit 120 includes the inductor unit Lf, the switch S3, the capacitor unit Cl, the inductor unit L1, and the capacitor unit Cs. A first terminal of the inductor unit Lf is electrically coupled to the positive terminal of the DC input voltage Vin. A first terminal of the switch S3 is electrically coupled to a second terminal of the inductor unit Lf, and a second terminal of the switch S3 is electrically coupled to the negative terminal of the DC input voltage Vin. A first terminal of the capacitor unit Cl is electrically coupled to a second terminal of the inductor unit Lf, and a second terminal of the capacitor unit Cl is electrically coupled to the negative terminal of the DC input voltage Vin. The inductor unit L1 and the capacitor unit Cs are coupled to each other in series, and electrically coupled between a first terminal of the capacitor unit Cs and the primary winding Np.

Thus, the inductor unit Lf, the switch S3, the capacitor unit Cl, the inductor unit L1 and the capacitor unit Cs may form a single switch class E resonant circuit. Thus, by controlling on or off of the switch S3 properly, the primary circuit 120 may provide the primary current flowing through the primary winding Np accordingly.

Figure 7:
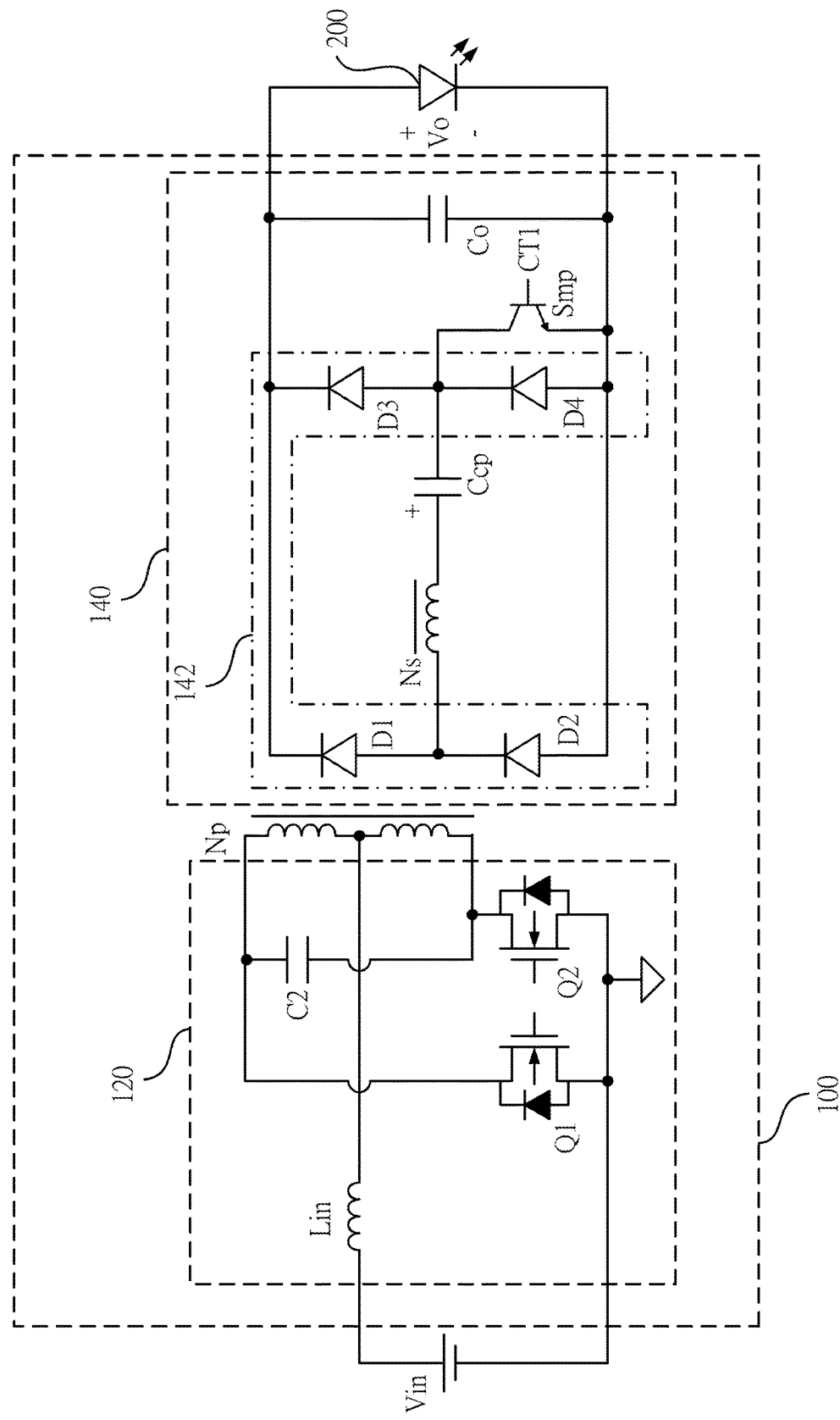
FIG. 7 is a diagram illustrating the LED power supply device according to some other embodiments of the present disclosure.

Reference is made to FIG. 7. FIG. 7 is a diagram illustrating the LED power supply device 100 according to some other embodiments of the present disclosure. Similarly, in the present embodiment, compared to the embodiments shown in FIG. 1 and FIG. 6, the primary circuit 120 may be implemented with various structures. Specifically, as shown in FIG. 7, in some embodiments, the primary circuit 120 includes the inductor unit Lin, the transistors Q1, Q2, and the capacitor unit C2. A first terminal of the inductor unit Lin is electrically coupled to the positive terminal of the DC input voltage Vin. A second terminal of the inductor unit Lin is electrically coupled to the center tapped terminal of the primary winding Np. A first terminal of the transistor Q1 is electrically coupled to the first terminal of the primary winding Np, and a second terminal of the transistor Q1 is electrically coupled to the negative terminal of the DC input voltage Vin. A first terminal of the transistor Q2 is electrically coupled to the second terminal of the primary winding Np, and a second terminal of the transistor Q2 is electrically coupled to the negative terminal of the DC input voltage Vin. The capacitor unit C2 is electrically coupled across the first terminal and the second terminal of the primary winding Np.

Thus, the inductor unit Lin, the transistors Q1, Q2, and the capacitor unit C2 may form a Push-Pull resonant circuit to implement the primary circuit 120. Thus, by controlling on or off of the transistors Q1, Q2 properly, the primary circuit 120 may provide the primary current flowing through the primary winding Np accordingly.

Alternatively stated, in various embodiments, the primary circuit 120 may be realized by resonant circuits of various forms such as LC, LCC, LLC and LLCC with one switch or two switches, and thus those illustrated in the drawings are merely by examples and not meant to limit the present disclosure.

Figure 8:
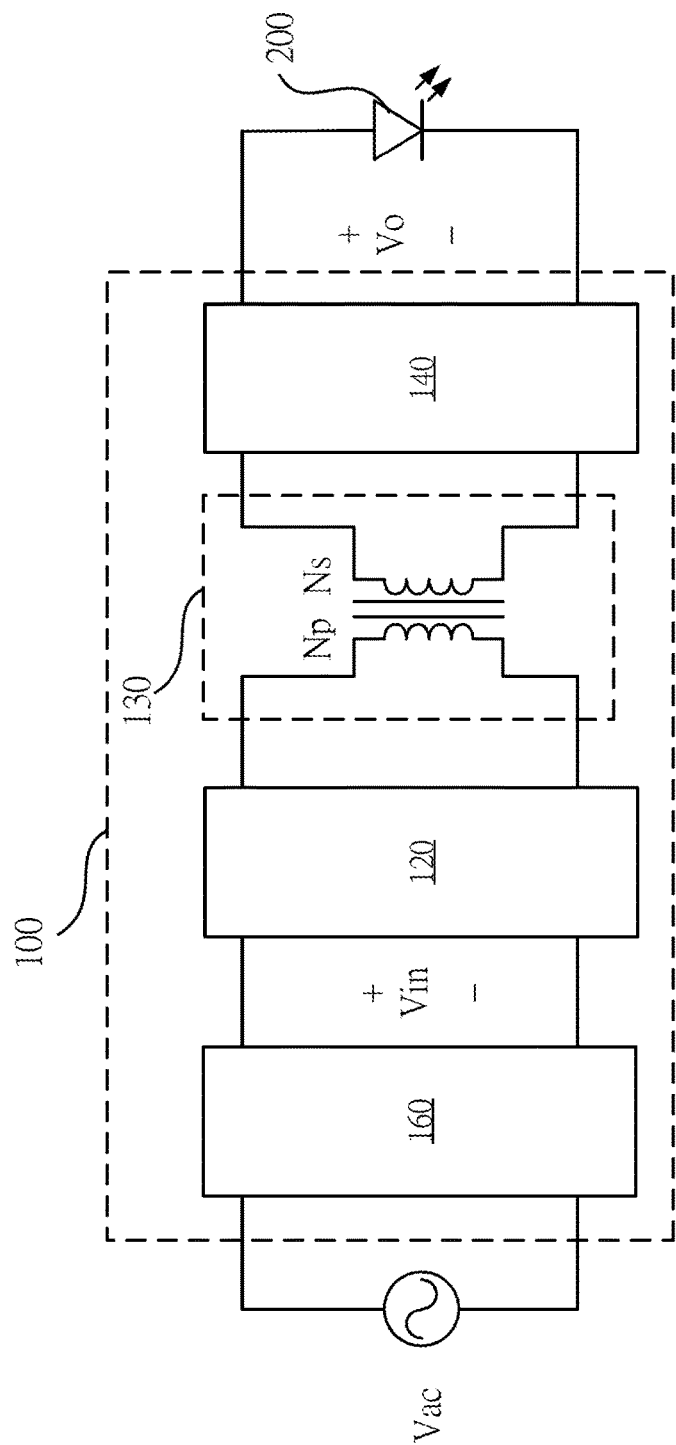
FIG. 8 is a diagram illustrating the LED power supply device according to some other embodiments of the present disclosure.

Reference is made to FIG. 8. FIG. 8 is a diagram illustrating the LED power supply device 100 according to some other embodiments of the present disclosure. As shown in FIG. 8, in some embodiments, the LED power supply device 100 further includes a power factor correction circuit 160. The power factor correction circuit 160 is electrically coupled to the primary circuit 120, and configured to convert an AC input voltage to the DC input voltage Vin to provide proper DC input voltage Vin to the primary circuit 120. In some embodiments, the power factor correction (PFC) circuit 160 may include an active power factor correction device and improve the power factor value of the circuit by controlling on or off of the transistor switch properly. In some other embodiments, the power factor correction circuit 160 may include a passive power factor correction device and improve the power factor value of the circuit by arranging inductors and/or capacitors.

For example, the LED module 200 externally connected to the output terminal of the LED power supply device 100 may be a lighting module with rated voltage 50V and rated current 4A, a lighting module with rated voltage 100V and rated current 2A, or a lighting module with rated voltage 200V and rated current 1A. If the rated voltage required by the LED module 200 is 50V or 100V, the LED power supply device 100 may operate under the first modulation mode to output the normal level, and adjust the output voltage Vo to corresponding voltage level by changing the switching frequency of the switching circuit 122. On the other hand, if the rated voltage required by the LED module 200 is 200V, the LED power supply device 100 may operate under the first modulation mode to output the doubled level, and adjust the output voltage Vo to corresponding voltage level by changing the switching frequency of the switching circuit 122.

Alternatively stated, in some embodiments, the LED power supply device 100 may switch between modulation modes according to the region of the output voltage, and switch from the first modulation mode to the second modulation mode if the output voltage Vo is higher than a set value, in order to operate the switching frequency of the switching circuit 122 at a new operating point closing to the resonant frequency. Thus, the LED power supply device 100 may achieve the wide range voltage output with small variation of the switching frequency, and increase the power conversion efficiency of the overall circuit.

Accordingly, on the condition that the LED power supply device 100 receives ac power from the grid as the power source, the power factor correction circuit 160 may be used to improve the power factor value of the load side, in order to meet the regulations in law and lower the burden of the power system to improve the quality of power supply.

In summary, in various embodiments of the present disclosure, since the LED power supply device 100 does not have to switch the unidirectional controllable power switch Smp on the condition that the modulation mode remains unchanged, and no further control is required by the diodes D1-D4 in the bridge rectifier circuit 142, the LED power supply device 100 may reduce unnecessary power loss while the wide range the output voltage Vo is provided.

In addition, in some embodiments, since the secondary circuit 140 does not use multiple active switching elements to achieve the charge-pump ability, no dead time configuration is required in the control circuit to avoid the current surge resulted when the switching elements are conducted at the same time. Thus, the control of the LED power supply device 100 may be further simplified.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A light-emitting diode power supply device comprising:
   a primary winding;
   a secondary winding comprising a first terminal and a second terminal, and configured to output a secondary current in response to a primary current flowing through the primary winding;
   a charge-pump capacitor comprising a first terminal and a second terminal, wherein the first terminal of the charge-pump capacitor is electrically coupled to the second terminal of the secondary winding;
   a bridge rectifier circuit electrically coupled to the first terminal of the secondary winding and the second terminal of the charge-pump capacitor;
   a unidirectional controllable power switch, wherein the unidirectional controllable power switch is inversely parallel-connected to one of a plurality of diodes in the bridge rectifier circuit, and configured to be on or off selectively according to a control voltage; and
   an output capacitor electrically coupled to the bridge rectifier circuit and configured to provide an output voltage according to the secondary current.

2. The light-emitting diode power supply device of claim 1, wherein the bridge rectifier circuit comprises:
   a first diode, wherein an anode of the first diode is electrically coupled to the first terminal of the secondary winding;
   a second diode, wherein an anode of the second diode is electrically coupled to a ground, and a cathode of the second diode is electrically coupled to the first terminal of the secondary winding;
   a third diode, wherein an anode of the third diode is electrically coupled to the second terminal of the charge-pump capacitor, and a cathode of the third diode is electrically coupled to a cathode of the first diode; and
   a fourth diode, wherein an anode of the fourth diode is electrically coupled to a ground, and a cathode of the fourth diode is electrically coupled to the second terminal of the charge-pump capacitor.

3. The light-emitting diode power supply device of claim 2, wherein the unidirectional controllable power switch is inversely parallel-connected to the fourth diode.

4. The light-emitting diode power supply device of claim 3, wherein on the condition that the unidirectional controllable power switch is on according to the control voltage, the current flowing through the third diode is zero.

5. The light-emitting diode power supply device of claim 2, wherein the unidirectional controllable power switch is inversely parallel-connected to the third diode.

6. The light-emitting diode power supply device of claim 5, wherein on the condition that the unidirectional controllable power switch is on according to the control voltage, the current flowing through the fourth diode is zero.

7. The light-emitting diode power supply device of claim 1, wherein on the condition that the unidirectional controllable power switch is off according to the control voltage, the output voltage is about an average voltage of the secondary winding after rectification in a complete cycle.

8. The light-emitting diode power supply device of claim 7, wherein on the condition that the unidirectional controllable power switch is on according to the control voltage, the output voltage is about twice of the average voltage of the secondary winding after rectification in the complete cycle.

9. The light-emitting diode power supply device of claim 1, further comprising a primary circuit, wherein the primary circuit comprises:
   a switching circuit configured to convert a dc input voltage to a switching signal; and
   a resonant circuit electrically coupled to the switching circuit and the primary winding, and configured to receive the switching signal to provide the primary current.

10. The light-emitting diode power supply device of claim 9, wherein the resonant circuit comprises:
    a resonant capacitor unit electrically coupled to the primary winding in series;
    a resonant inductor unit electrically coupled to the primary winding in series; and
    a magnetic inductor unit electrically coupled to the primary winding in parallel.

11. The light-emitting diode power supply device of claim 9, wherein the switching circuit comprises:
    a first switch, wherein a first terminal of the first switch is electrically coupled to a positive terminal of the dc input voltage, and a second terminal of the first switch is electrically coupled to the resonant circuit; and
    a second switch, wherein a first terminal of the second switch is electrically coupled to the second terminal of the first switch, and a second terminal of the second switch is electrically coupled to a negative terminal of the dc input voltage.

12. The light-emitting diode power supply device of claim 1, further comprising a primary circuit, wherein the primary circuit comprises:
   a first inductor unit, wherein a first terminal of the first inductor unit is electrically coupled to a positive terminal of a dc input voltage;
   a switch, wherein a first terminal of the switch is electrically coupled to a second terminal of the first inductor unit, and a second terminal of the switch is electrically coupled to a negative terminal of the dc input voltage;
   a first capacitor unit, wherein a first terminal of the first capacitor unit is electrically coupled to a second terminal of the first inductor unit, and a second terminal of the first capacitor unit is electrically coupled to the negative terminal of the dc input voltage;
   a second inductor unit; and
   a second capacitor unit, wherein the second inductor unit and the second capacitor unit are coupled to each other in series, and electrically coupled between the first terminal of the first capacitor unit and the primary winding.

13. A power supply device for providing an output voltage to a light-emitting diode module, wherein the power supply device comprises:
   an isolated transformer, comprising:
      a primary winding; and
      a secondary winding configured to provide a secondary current in response to a primary current flowing through the primary winding;
   a primary circuit electrically coupled to the primary winding of the isolated transformer and configured to provide the primary current according to a dc input voltage;
   a charge-pump capacitor electrically coupled to the secondary winding;
   a bridge rectifier circuit, wherein the bridge rectifier circuit comprises a first diode, a second diode, a third diode, and a fourth diode; and
   a unidirectional controllable power switch, wherein the unidirectional controllable power switch is inversely parallel-connected to the third diode or the fourth diode and configured to be on or off selectively to determine the power supply device operating under a first modulation mode or a second modulation mode to output the corresponding output voltage, wherein under the first modulation mode, the unidirectional controllable power switch is kept at off, and under the second modulation mode, the unidirectional controllable power switch is kept at on.

14. The power supply device of claim 13, further comprising a primary circuit, wherein the output voltage outputted by the power supply device operating under the second modulation mode is about twice of the output voltage outputted by the power supply device operating under the first modulation mode.

15. The power supply device of claim 13, further comprising:
   a power factor correction circuit electrically coupled to the primary circuit and configured to convert an ac input voltage to the dc input voltage.

16. The power supply device of claim 13, wherein the unidirectional controllable power switch comprises a bipolar transistor, an insulated gate bipolar transistor, or a silicon controlled rectifier.

17. The power supply device of claim 13, wherein the primary circuit comprises:
   a switching circuit configured to convert the dc input voltage to a switching signal; and
   a resonant circuit electrically coupled to the switching circuit and the primary winding, and configured to receive the switching signal to provide the primary current.

18. The power supply device of claim 13, wherein an anode of the first diode is electrically coupled to a first terminal of the secondary winding, an anode of the second diode is electrically coupled to a ground, a cathode of the second diode is electrically coupled to the first terminal of the secondary winding, an anode of the third diode is electrically coupled to a second terminal of the charge-pump capacitor, a cathode of the third diode is electrically coupled to a cathode of the first diode, an anode of the fourth diode is electrically coupled to a ground, and a cathode of the fourth diode is electrically coupled to the second terminal of the charge-pump capacitor.

19. The power supply device of claim 18, wherein the unidirectional controllable power switch is inversely parallel-connected to the fourth diode, and the current flowing through the third diode is zero on the condition that the unidirectional controllable power switch is on.

20. The power supply device of claim 18, wherein the unidirectional controllable power switch is inversely parallel-connected to the third diode, and the current flowing through the fourth diode is zero on the condition that the unidirectional controllable power switch is on.

* * * * *